April 26, 1932.  F. O'BRIEN  1,855,256

GRILLE

Filed Jan. 29, 1932  2 Sheets-Sheet 1

INVENTOR
Falconer O'Brien
BY
Chappell Earl
ATTORNEYS

April 26, 1932.  F. O'BRIEN  1,855,256
GRILLE
Filed Jan. 29, 1932   2 Sheets-Sheet 2
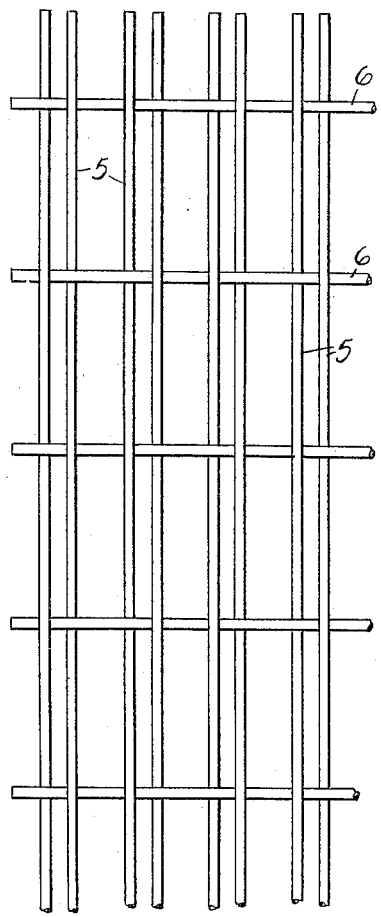
Fig. 5
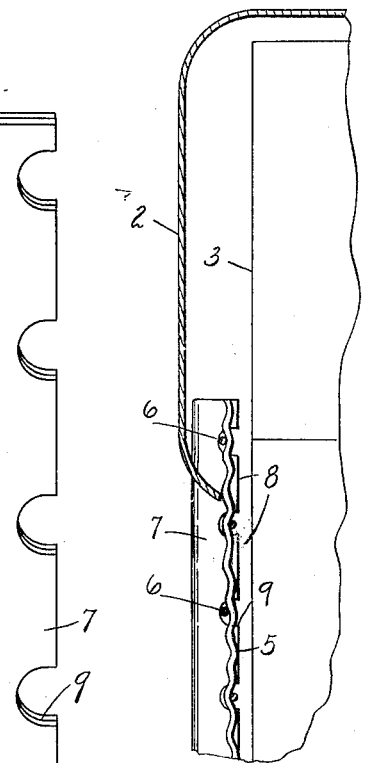
Fig. 6
Fig. 7
INVENTOR
Falconer O'Brien
BY
Chappell & Earl
ATTORNEYS Patented Apr. 26, 1932

1,855,256

UNITED STATES PATENT OFFICE

FALCONER O'BRIEN, OF DETROIT, MICHIGAN, ASSIGNOR TO L. A. YOUNG SPRING & WIRE CORPORATION, OF DETROIT, MICHIGAN

GRILLE

Application filed January 29, 1932. Serial No. 589,621.

The main objects of this invention are:

First, to provide an improved grille which is well adapted as a guard for automobile radiators and the like.

Second, to provide a grille which is strong and rigid and has an attractive and relatively massive appearance, although made of light material.

Third, to provide a structure of this character which is very economical to produce and may be made in various sizes, and to present the desired appearance, without departing from the general structure.

Objects pertaining to details and economies of my invention will definitely appear from the description to follow. The invention is defined in the claims.

A structure which embodies the features of my invention is clearly illustrated in the accompanying drawings, in which:

Fig. 5 is a fragmentary elevation of the wire grid showing the relation of the strands thereof, no attempt being made to illustrate the corrugations of the strands appearing in the other figures.

Fig. 6 is a fragmentary perspective view of one of the grille bars.

Fig. 7 is an enlarged detail sectional view taken on a line corresponding to line 7—7 of Fig. 1 showing the relation of the grill to an automobile radiator shell or housing.

Figure 1:
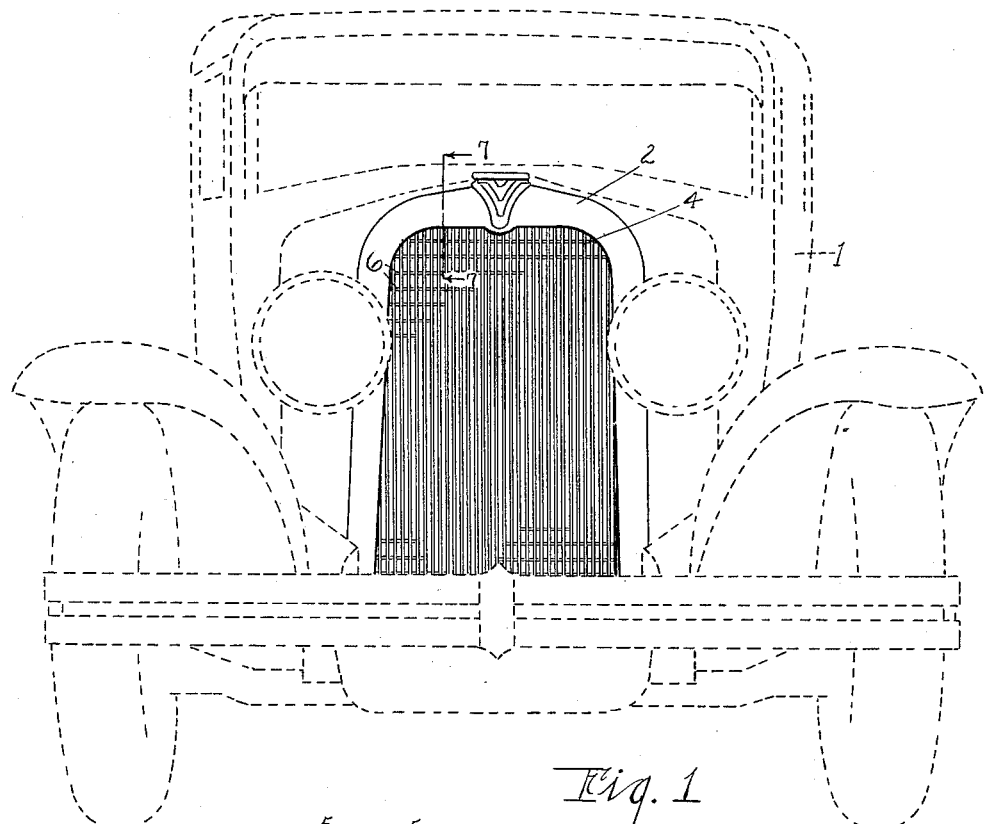
Fig. 1 is a front elevation of an automobile radiator embodying my invention, the vehicle being indicated by dotted lines, to show a commercial adaptation of my improvements.
Figure 3:
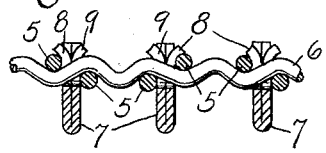
Fig. 3 is a fragmentary view in section on line 3—3 of Fig. 2.
Figure 4:
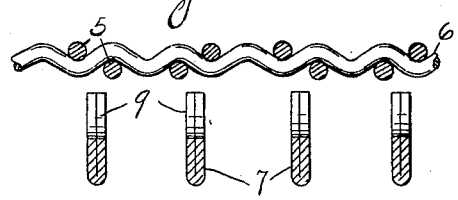
Fig. 4 is a fragmentary sectional view of partially assembled parts.
Figure 2:
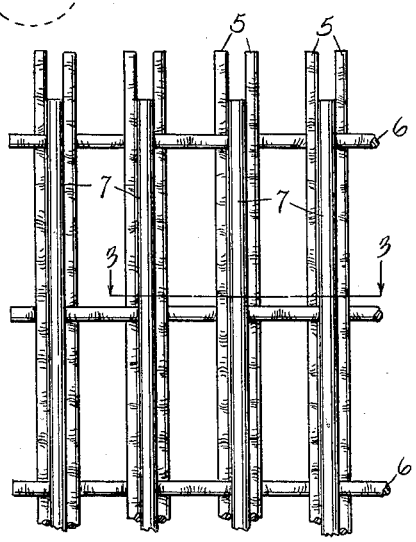
Fig. 2 is a fragmentary front elevation of my improved grille.

Referring to the accompanying drawings, 1 represents an automobile of the passenger type and 2 the radiator shell or housing for the radiator shown conventionally at 3. My improved grille, designated generally by the numeral 4, is arranged within the shell to constitute a guard for the radiator and an ornamental front. The means of attachment are not illustrated as they form no part of this invention.

My improved grille comprises a grid formed of strands 5 and 6 which are interwoven, the strands 5 being arranged in spaced pairs and in parallel relation transversely of the strands 6. The strands 5 are the longitudinal strands of the grille. These strands are preferably corrugated as illustrated which facilitates weaving as it permits weaving without placing the strands under material bending stress such as required where straight strands or wires are used.

For each pair of strands 5 I provide a bar 7, the bar being arranged between the pairs of strands and parts thereof expanded or deflected laterally as at 8 into engagement with the strands 5, thereby locking the pairs in position. These bars have notches 9 in their inner edges spaced to receive the transverse strands 6.

The bars 7 are preferably formed of strips of sheet metal folded longitudinally as illustrated in the drawings, the bights of the metal being arranged outwardly. This presents a rounded outer edge and the bars are attached and supported so that they constitute effective reinforcing members for the wire grid, which may be made of comparatively light material and at the same time effectively supports the bars.

The pairs of longitudinal strands 5 in appearance merge into the bars 7 so that in use as embodied in automobile guards or grilles the transverse bars are quite inconspicuous.

The structures may be formed of relatively light material and at the same time are strong, durable and attractive in appearance. While the particular grille illustrated is designed for use in connection with automobile radiators, the structure may be readily adapted to grilles designed for various other uses. I have not attempted to illustrate these various adaptations as it is believed this disclosure will enable those skilled in the art to embody or adapt my improvements as may be desired.

Having thus described my invention what I claim as new and desire to secure by Letters Patent is:

1. A structure of the class described comprising a woven wire grid consisting of longitudinal strands arranged in spaced pairs and transverse strands interwoven therewith, the strands being corrugated, and longitudinal bars formed of longitudinally folded strips of sheet metal having notches in their inner edges disposed to receive the transverse strands when the bars are arranged between the pairs of longitudinal strands, the inner edges of the bars being expanded into locking engagement with the pairs of longitudinal strands.

2. A structure of the class described comprising a woven wire grid consisting of longitudinal strands arranged in spaced pairs and transverse strands interwoven therewith, and longitudinal bars formed of longitudinally folded strips of sheet metal having notches in their inner edges disposed to receive the transverse strands when the bars are arranged between the pairs of longitudinal strands, the inner edges of the bars being expanded into locking engagement with the pairs of longitudinal strands.

3. A structure of the class described comprising a wire grid consisting of longitudinal strands arranged in spaced pairs and transverse strands interwoven therewith, the strands being corrugated, and longitudinal bars having notches in their inner edges disposed to receive the transverse strands when the bars are arranged between the pairs of longitudinal strands, parts of the inner edges of the bars being offset into locking engagement with the pairs of longitudinal strands.

4. A structure of the class described comprising a wire grid consisting of longitudinal strands arranged in spaced pairs and transverse strands interwoven therewith, and longitudinal bars having notches in their inner edges disposed to receive the transverse strands when the bars are arranged between the pairs of longitudinal strands, parts of the inner edges of the bars being offset into locking engagement with the pairs of longitudinal strands.

5. A structure of the class described comprising a woven grid of corrugated wire, the strands running in one direction being arranged in spaced pairs, and bars formed of sheet material folded longitudinally upon itself and having notches in its inner edges spaced to receive the strands running in the other direction arranged between pairs of strands with their bights outwardly, parts of the inner edges of the bars being expanded at the inner sides of the pairs of strands to lock the bars in position therein.

6. A structure of the class described comprising a woven grid, the strands running in one direction being arranged in spaced pairs, and bars formed of sheet material folded longitudinally upon itself and having notches in its inner edges spaced to receive the strands running in the other direction arranged between pairs of strands with their bights outwardly, parts of the inner edges of the bars being expanded at the inner sides of the pairs of strands to lock the bars in position therein.

7. A structure of the class described comprising a woven wire grid, the strands running in one direction being arranged in spaced pairs, and bars arranged between the pairs of strands and notched to receive the strands running in the other direction, the bars having laterally disposed parts on their inner edges acting to support them in position.

8. A structure of the class described comprising a woven wire grid having strands running in one direction disposed in spaced pairs, and bars formed of material folded longitudinally upon itself disposed between said spaced pairs of bars, portions of the edges of the bars being deflected laterally into supporting engagement with an adjacent strand.

9. A structure of the class described comprising a woven wire grid having strands running in one direction disposed in spaced pairs, and bars disposed between said spaced pairs of bars and notched to receive the strands running in the other direction, portions of the edges of the bars being deflected laterally into supporting engagement with an adjacent strand.

In witness whereof I have hereunto set my hand.

FALCONER O'BRIEN.